United States Patent [19]

Akao

[11] Patent Number: 5,073,437
[45] Date of Patent: Dec. 17, 1991

[54] PACKAGING MATERIAL FOR PHOTOSENSITIVE MATERIALS

[75] Inventor: Mutsuo Akao, Kanagawa, Japan

[73] Assignee: Fuji Photo Film Co., Ltd., Kanagawa, Japan

[21] Appl. No.: 313,870

[22] Filed: Feb. 22, 1989

[30] Foreign Application Priority Data

Feb. 23, 1988 [JP] Japan .................................. 63-40302

[51] Int. Cl.$^5$ .......................... B32B 7/02; C08L 23/00
[52] U.S. Cl. ...................................... 428/220; 428/500; 428/516; 428/35.7; 525/240
[58] Field of Search ................. 428/516, 500, 220; 525/240

[56] References Cited

U.S. PATENT DOCUMENTS

| | | | |
|---|---|---|---|
| 4,576,865 | 3/1986 | Akao | 428/333 |
| 4,579,781 | 4/1986 | Akao | 428/461 |
| 4,584,234 | 4/1986 | Hirose et al. | 428/323 |
| 4,661,395 | 4/1987 | Akao | 428/213 |
| 4,710,359 | 10/1987 | Akao | 428/35 |
| 4,894,264 | 1/1990 | Akao et al. | 428/34.2 |
| 4,906,517 | 3/1990 | Akao et al. | 428/216 |

FOREIGN PATENT DOCUMENTS 326181 8/1989 European Pat. Off. .

*Primary Examiner*—Edith L. Buffalow
*Attorney, Agent, or Firm*—Burns, Doane, Swecker & Mathis

[57] ABSTRACT

A packaging material for photosensitive materials comprising a combination of a linear very low density polyethylene resin and a high density polyethylene resin as the resin components. The linear very low density polyethylene resin improves flexibility, low temperature resistance, heat sealing properties and physical strength such as impact puncture strength and tear strength. The polyethylene resin exhibits antiblocking property. The packaging material of the invention is excellent in flexibility, low temperature resistance and impact puncture strength, and blocking does not occur. Since the dispersibility of carbon black is excellent, lump generation troubles and fish eye troubles are rare. Moreover, low temperature heat sealability is excellent.

4 Claims, 1 Drawing Sheet

PACKAGING MATERIAL FOR PHOTOSENSITIVE MATERIALS

BACKGROUND OF THE INVENTION

1. Field of the Invention

This invention relates to a packaging material for photosensitive materials, suitable for packaging relatively heavy products including various photographic photosensitive materials, other photosensitive materials and electronic parts, such as rolls of film for movies.

2. Description of the Prior Art

In general, packaging materials for the products of high technology, such as photographic photosensitive materials, are required to satisfy various properties, such as gas barrier, moistureproofness, physical strength such as breaking strength, tear strength, impact puncture strength, Gelbo test strength and wear resistance, heat sealing properties such as heat seal strength, side welding properties, hot tack properties and sealability with other materials, antistatic properties, slip properties, low dusting, and flatness, in addition to the light-shielding ability capable of shielding light completely.

Heretofore, various proposals have been made for satisfying the above properties.

The inventor has conducted investigations for improving the packaging materials for photosensitive materials, and for example, he has disclosed a packaging material wherein the physical strength is improved by combining two uniaxially stretched films (U.S. Pat. No. 4,331,725). The inventor has also disclosed a laminated film, composed of a foamed sheet having a thickness of 0.3 to 2 mm and a blow-up ratio of 5 to 50 times and two uniaxially molecularly oriented thermoplastic resin films adhered on the both sides of the foamed sheet by melt adhesion directly or through an extrusion laminating adhesive layer so that respective molecular orientation axes cross each other at an angle of more than 30 degrees, of which the thickness is reduced to 40 to 85% of the total thickness by pressing (U.S. Pat. No. 4,565,733). The laminated film has a great impact puncture strength and Gelbo test strength, and it is excellent as a packaging material for heavy products.

However, the above packaging materials were inferior in the dispersibility of carbon black, and lumps and fish eyes frequently occurred. They were also inferior in heat sealing properties and bag-making ability, and were expensive.

SUMMARY OF THE INVENTION

An object of the invention is to provide a packaging material for photosensitive materials which do not exhibit lump generation troubles, fish eye troubles blocking, and which have a great physical strength and are excellent in bag-making ability and are inexpensive.

The present invention provides a packaging material for photosensitive materials which achieve such objects, which comprises a light-shielding linear low density polyethylene resin film layer comprising 40 to 97 wt. % of linear very low density polyethylene resin having a density of 0.870 to 0.918 g/cm$^3$, a melt flow rate of 0.3 to 5 g/10 minutes and a Vicat softening point of lower than 99° C., 3 to 50 wt. % of polyethylene resin having a density of 0.930 to 0.965 g/cm$^3$, a melt flow rate of 0.4 to 5 g/10 minutes and a Vicat softening point of higher than 110° C., 0.1 to 15 wt. % of carbon black and 0.01 to 2 wt. % of antioxidant.

DETAILED DESCRIPTION OF THE INVENTION

Figure 1:
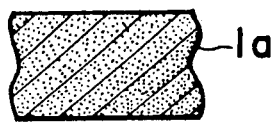
FIGS. 1 to 8 are partially sectional views of preferred embodiments of the invention.

The linear very low density polyethylene resin is a linear low density polyethylene (L-LDPE) resin having a density (ASTM D-1505) of 0.870 to 0.918 g/cm$^3$. When the density is less than 0.870 g/cm$^3$, resin productivity is inferior, and blocking is liable to occur. While, when the density is beyond 0.918 g/cm$^3$, the light-shielding L-LDPE resin film layer cannot exhibit the characteristics because the superiorities of this resin in flexibility, impact puncture strength, film moldability, low temperature resistance, the ability to incorporate filler and the like decrease. A density (ASTM D-1505) in the range of 0.890 to 0.910 is particularly preferred. The melt index (MI, ASTM D-1238) is 0.3 to 5 g/10 minutes, preferably 0.8 to 3 g/10 minutes. When the MFR is less than 0.3 g/10 minutes, film moldability is inferior. Melt fracture occurs, and discharge sharply decreases. While, when the MFR is beyond 5 g/10 minutes, film moldability is inferior, to draw down occurs, and the inflation bubble is unstable. Moreover, blocking occurs. The Vicat softening point (ASTM D-1525) is lower than 99° C., preferably 55° to 97° C. When the Vicat softening point is beyond 99° C., motor load at the time of molding is great. Melt fracture is liable to occur, and film moldability is inferior. The superiorities in flexibility, and low temperature resistance, low temperature heat sealability are lost. The molecular weight distribution (weight average molecular weight/number average molecular weight) of such a L-LDPE resin is more than 2.5, preferably 3.5 to 9, more preferably 4 to 8, measured by gel permeation chromatography. Examples of commercial linear very low density polyethylene resins are "NUC-FLX" (UCC) which is copolymer of ethylene and butene-1, "ULTZEX" (Mitsui Petrochemical Industries) which is a copolymer of ethylene and 4-methylpentene-1, "TUFLIN" (UCC) and "TUFTHENE" (Nippon Unicar) which are copolymers of ethylene and hexene-1, and "STAMILEX" (DSM), "DOWLEX" (Dow Chemical) and "MORETEC" (Idemitsu Petrochemical) which are copolymers of ethylene and octene-1. The content of the linear very low density polyethylene resin is 40 to 97 wt. % 50 to 90.

The density (ASTM D-1505) of the polyethylene resin is 0.930 to 0.965 g/cm$^3$, and high density polyethylene resin having a density of 0.940 to 0.960 g/cm$^3$ is particularly preferred. When the density is less than 0.930 g/cm$^3$, antiblocking property is insufficient in the resin content of the invention. While, when the density is beyond 0.965 g/cm$^3$, film moldability is inferior, and lump generation troubles and fish eye troubles increase. Moreover, tear strength in the longitudinal direction decreases. The MFR (ASTM D-1238) is 0.4 to 5 g/10 minutes, preferably 1 to 3 g/10 minutes. When the MFR is less than 0.4 g/10 minutes, the polyethylene resin is inferior in blending ability with the principal component of the linear very low density polyethylene resin. As a result, lump generation trouble and fish eye troubles occur, and film moldability is inferior. Moreover, molecular orientation is liable to occur in longitudinal direction, and the difference between the tear strength in the longitudinal direction and that in the lateral direction is great. While, when the MFR is beyond 5 g/10 minutes, draw down is liable to occur. Physical strength decreases, and the antiblocking effect decreases. The Vicat softening point (ASTM D-1525) is higher than 110° C., preferably 120° to 135° C. When the Vicat softening point is lower than 110° C., antiblocking effect is insufficient in the resin content of the invention. The content of the polyethylene resin is 3 to 50 wt. %, preferably 5 to 30 wt. %. When the content is less than 3 wt. %, the antiblocking effect is insufficient. While, when the content is beyond 50 wt. %, the superiorities of the linear very low density polyethylene resin, such as flexibility, tear strength, impact puncture strength, low temperature resistance, low temperature heat sealability, are lost.

Carbon blacks are divided into gas black, oil furnace black, anthracene black, acetylene black, lamp black, vegetable black and animal black according to their origin. Among these, oil furnace carbon black is preferable in terms of light-shielding character, cost and improvement of properties. On the other hand, since acetylene black and Ketschen carbon black have antistatic characteristics, they are also preferable, though they are expensive. They may be blended with the oil furnace black in order to improve its character. A suitable pH of the carbon black is from 5 to 9, particularly 6 to 8, and a suitable means particle size is 10 to 80 mμ. Particularly, the oil furnace carbon black and the acetylene black having pH 6 to 9 and a mean particle size of 15 to 50 mμ are preferable. By using the carbon black of such pH and particle size, a packaging material having the following merits is obtained. That is, the occurrence of fogging is rare, an increase or decrease of photosensitivity rarely happens, light-shielding ability is large, and the generation of lumps of carbon black and pinholes such as fish eyes hardly are generated. The content of carbon black is 0.1 to 15 wt. %, preferably 0.5 to 7 wt. %. When the content is less than 0.1 wt. %, light-shielding ability is insufficient, and antiblocking effect, antistatic effect, antioxidizing effect and the improvement in physical strength decrease. While, when the content is beyond 15 wt. %, carbon black is released by the friction with the packaged products during transportation, and adheres to the surface of the products. Moreover, heat sealing properties, moistureproofness and the like are degraded.

Suitable antioxidants are phenol antioxidants, sulfur-containing antioxidants, phosphorus-containing antioxidants and the like. The phenol antioxidants include n-octadecyl-3-(3′,5′-di-t-butyl-4′-hydroxyphenyl)propionate, 2,6-di-t-butyl-4-methylphenol, 2,6-di-t-butyl-p-cresol (BHT), 2,2′-methylenebis(4-methyl-6-t-butylphenol), 4,4′-thiobis(3-methyl-6-t-butylphenol), 4,4′-butylidenebis(3-methyl-6-t-butylphenol), stearyl-β-(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl) benzene, octadecyl-3-(3,5-di-t-butyl-4-hydroxyphenyl) propionate and tetrakis methylene-3(3′,5′-di-t-butyl-4′-hydroxyphenyl)propionate methane. The sulfur-containing oxidation inhibitors include dilauryl-3,3′-thiodipropionate, dimyristyl-3,3′-thiodipropionate, laurylstearylthiodipropionate, distearyl-3,3′-thiodipropionate and ditridecyl-3,3′-thiodipropionate. The phosphorus-containing antioxidants include trinonylphenylphosphite and triphenylphosphite. Particularly effective antioxidants are BHT, low volatile high molecular weight phenol antioxidants ("Irganox 1010", "Irganox 1076", trade names of Ciba-Geigy A. G., "Topanol CA", trade name of I.C.I., etc.), dilaurylthiodipropionate, distearylthiodipropionate, dialkylphospate, etc. Particularly preferable antioxidants are phenol antioxidants. Two or more antioxidants may be combined. The content of the antioxidant is in the range of 0.01 to 2 wt. %, preferably 0.02 to 0.5 wt. %. When the content is less than 0.01 wt. %, the antioxidizing effect hardly appears. While, when the content is beyond 2 wt. %, fogging of the packaged photographic photosensitive materials and variation of photosensitivity occur. Moreover, the increase in weight caused by the antioxidant is small.

A lubricants is preferably added to the light-shielding L-LDPE resin film layer. Preferably lubricants are fatty acid amide lubricant, and include:

Oleic acid amide lubricants; "ARMOSLIP-CP" (Lion Akzo Co., Ltd.), "NEWTRON" and "NEWTRON E-18" (Nippon Fine Chemical Co., Ltd.), "AMIDE-O" (Nitto Kagaku K.K.), "DIAMID O-200" and "DIAMID G-200" (Nippon Kasei Chemical Co., Ltd.), "ALFLOW E-10" (Nippon Oil and Fats Co., Ltd.), etc.

Erucic acid amide lubricants; "ALFLOW P-10" (Nippon Oil and Fats Co., Ltd.), "NEWTRON S" (Nippon Fine Chemical Co., Ltd.), etc.

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical co., Ltd.), etc.

Bis fatty acid amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

A suitable content of the fatty acid amide lubricant is 0.01 to 1 wt. %.

The packaging material of the invention may be a single layer film, a coextruded multilayer film containing the light-shielding L-LDPE resin film layer or a laminated film laminated with flexible sheet(s) or the like.

The packaging material of the invention may be used for packaging photosensitive materials such as photographic photosensitive materials, foods, medicines or chemical substances, and it is particularly suitable for packaging silver halide photographic photosensitive materials, diazo photographic photosensitive materials, photosensitive resins, self-developing type photographic photosensitive materials, heat-developing type photosensitive materials, direct positive color photosensitive materials, diffusion transfer type photographic photosensitive materials and other photographic materials which is degraded by small amounts of light, moisture or gas.

Package form may be conventional, and includes a single-sheet flat bag, a double-sheet flat bag, a self-standing bag, a single-sheet gusset bag, a double-sheet gusset bag, inner lining for a moistureproof box, inner lining for a light room-loading light-shielding box and a leader paper etc. The sealing form may also be conventional, and includes heat sealing, side welding, impulse heat sealing, ultrasonic sealing, and high frequency sealing etc. The methods of using an adhesive may also be utilized.

In the packaging material of the invention, the linear very low density polyethylene resin improves flexibility, low temperature resistance, heat sealing properties and physical strength such as impact puncture strength and tear strength. The polyethylene resin exhibits antiblocking properties. Carbon black imparts light-shielding and antistatic property, and improves antiblocking property and physical strength. Antioxidant prevents yellowing and discoloring, when the resin is heated at a high temperature. The packaging material of the invention is excellent in flexibility, low temperature resistance and impact puncture strength, and blocking does not occur. Since the dispersibility of carbon black is excellent, lump generation troubles and fish eye troubles are rare. Moreover, low temperature heat sealability is excellent.

Representative embodiments of the packaging material of the invention are illustrated in FIGS. 1 to 8.

The packaging material of FIG. 1 is a single layer film composed of the light-shielding L-LDPE resin film layer 1a.

Figure 2:
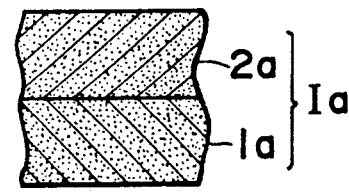

The packaging material of FIG. 2 is a coextruded multilayer light-shielding film composed of the light-shielding L-LDPE resin film layer 1a and a thermoplastic resin film layer 2a containing a light-shielding material.

Figure 3:
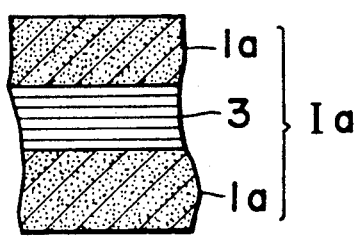

The packaging material of FIG. 3 is a coextruded multilayer light-shielding film composed of two light-shielding L-LDPE resin film layers 1a, 1a and an intermediate layer 3 interposed therebetween.

Figure 4:
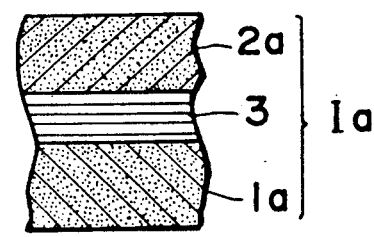

The packaging material of FIG. 4 is a coextruded multilayer light-shielding film composed of the light-shielding L-LDPE resin film layer 1a, a thermoplastic resin film layer 2a containing a light-shielding material and an intermediate layer 3 not containing a light-shielding material interposed therebetween.

Figure 5:
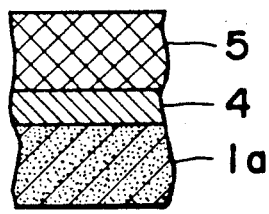

The packaging material of FIG. 5 is composed of the light-shielding L-LDPE resin film layer 1a and a flexible sheet layer 5 laminated through an adhesive layer 4.

Figure 6:
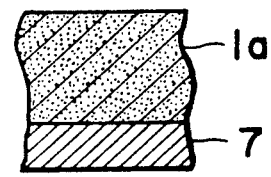

The packaging material of FIG. 6 is composed of the light-shielding L-LDPE resin film layer 1a and a heat seal layer 7 directly laminated thereto.

Figure 7:
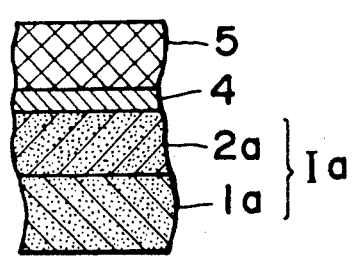

The packaging material of FIG. 7 is composed of the coextruded multilayer film shown in FIG. 2 and a flexible sheet layer 5 laminated on the thermoplastic resin film layer 2a side through an adhesive layer 4.

Figure 8:
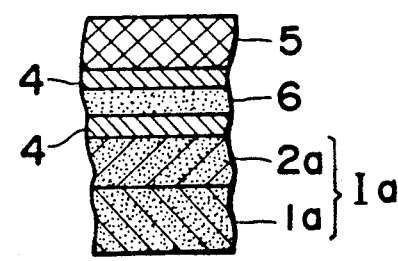

The packaging material of FIG. 8 is composed of the coextruded multilayer film shown in FIG. 2, a metal foil 6 laminated on the thermoplastic resin film layer 2a side through an adhesive layer 4 and a flexible sheet layer 5 laminated on the metal foil 6 through an adhesive layer 4.

EXAMPLES

The packaging material of Example I consisted of the light-shielding L-LDPE resin film layer 70 μm in thickness composed of 76.8 wt. % of linear very low density polyethylene resin which is a copolymer of ethylene and 4-methylpentene-1 having a density of 0.910 g/cm³, a MFR of 2.0 g/10 minutes and a Vicat softening point of 93° C., 20 wt. % of HDPE resin having a density of 0.954 g/cm³, a MFR of 1.1 g/10 minutes and a Vicat softening point of 126° C., 3 wt. % of furnace carbon black and 0.2 wt. % of antioxidant.

The packaging material of Example II consisted of the light-shielding L-LDPE resin film layer 70 μm in thickness composed of 81.8 wt. % of linear very low density polyethylene resin which is a copolymer of ethylene and 4-methylpentene-1 having a density of 0.915 g/cm³, a MFR of 2.3 g/10 minutes and a Vicat softening point 97° C., 15 wt. % of the same HDPE resin as employed in Example I, 3 wt. % of furnace carbon black and 0.2 wt. % of antioxidant.

Comparative packaging material I consisted of a single layer film 70 μm in thickness composed of 97 wt. % of L-LDPE resin which is a copolymer of ethylene and octene-1 having a density of 0.930 g/cm³, a MFR of 2.0 g/10 minutes and a Vicat softening point of 112° C. and 3 wt. % of furnace carbon black.

Comparative packaging material II consisted of a single layer film 70 μm in thickness composed of 94.5 wt. % of the same linear very low density polyethylene resin as employed in Example I, 3 wt. % of furnace carbon black and 2.5 wt. % of antioxidant.

Conventional packaging material I consisted of a single layer film 70 μm in thickness composed of 96.7 wt. % of LDPE resin having a density of 0.923 g/cm³ and a MFR of 2.4 g/10 minutes, 3 wt. % of furnace carbon black and 0.3 wt. % of antioxidant.

Various properties of the above packaging materials were measured, and the results are shown in Table 1.

TABLE 1

|  |  | Invention | | Comparative | | Conventional |
| --- | --- | --- | --- | --- | --- | --- |
|  |  | I | II | I | II | I |
| L-LDPE Resin | | | | | | |
| Density | g/cm³ | 0.910 | 0.915 | 0.930 | 0.910 | — |
| MFR | g/10 min. | 2.0 | 2.3 | 2.0 | 2.0 | — |
| Vicat Softening Point | °C. | 93 | 97 | 112 | 93 | — |
| Content | wt. % | 76.8 | 81.8 | 97 | 94.5 | — |
| Polyolefin Resin | — | HDPE | HDPE | — | — | LDPE |
| Density | g/cm³ | 0.954 | 0.954 | — | — | 0.923 |
| MI | g/10 min. | 1.1 | 1.1 | — | — | 2.4 |
| Vicat Softening Point | °C. | 126 | 126 | — | — | 93 |
| Content | wt. % | 20 | 15 | — | — | 96.7 |
| Carbon Black Content | wt. % | 3 | 3 | 3 | 3 | 3 |
| Antioxidant Content | wt. % | 0.2 | 0.2 | — | 2.5 | 0.3 |
| Photographic Properties | — | B | B | B | E | B |
| Film Moldability | — | B | B | C | D | B |
| Antiblocking Properties | — | A | A | B | E | B-C |
| Bag-Making Ability | — | A | A | C | A | D |
| Physical Strength | — | A | A | D | B | E |
| Dispersibility of Carbon Black | — | B | B | D | A | C |
| Flexibility | — | A | A | D | A | B |

Evaluations in Table 1 were carried out as follows:

| A very excellent | B excellent |
| --- | --- |
| C practical | D having a problem |
| E impractical | |

Density: ASTM D-1505
MFR: ASTM D-1238
Vicat Softening Point: ASTM D-1525

Photographic Properties:

A photographic sheet film of ASA 100 was placed in a flat bag made of each exemplified film, and completely sealed. Respective flat bags were exposed to the light of 80,000 luxes for one hour, and the light-shielding ability was estimated by the fogging degree of each photographic film after development. On the other hand, the above sealed bag was allowed to stand in a room at 50° C. in 80% RH for 3 days, and the photographic sheet film was developed. Then, the variations in photosensitivity, gradation, concentration and fogging were also evaluated in comparison with the same photographic sheet film not placed in the room.

Film Moldability:

Judged by total inflation film moldability including motor load (electric current value), bubble stability, the position of frosting line, fish eyes, lumps, wrinkling and the uniformity in film thickness, when each exemplified film was molded by using an inflation film molding machine.

Antiblocking Properties:

An open end of two sheets of each packaging material having a width of 15 mm was separated by pulling one end with a load of 45 g at an angle of 180 degrees immediately after molded through inflation process, and the antiblocking properties was judged by the resistance. Smaller resistance was judged better.

Bag-Making Ability:

Judged by the difference of melting points between the inner surface layer and the outer surface layer, low temperature heat sealing properties, heat seal strength, hot tack properties, sealability with other materials, elapsed heat seal strength, curling, the generation of pinholes, and bag ruptures during transportation of products, collectively.

Physical Strength:

Judged by tear strength (JIS P-8116), impact puncture strength (JIS P-8134), bursting strength (JIS P-8112) and heat seal strength, collectively.

Dispersibility of Carbon Black:

Judged by the light-shielding ability, the generation of fish eyes and lumps of each exemplified packaging material, when each exemplied film was molded by using an inflation film molding machine. The evaluation of the light-shielding ability was carried out in the same manner as in the above photographic properties.

Flexibility:

Judged by the rigidity (JIS P-8125) and the hand feeling, when the opening (for the insertion of product) of two-sided fin seal flat bag was turned.

I claim:

1. A packaging material for photosensitive materials which comprises a light-shielding linear low density polyethylene resin film layer comprising 40 to 95 wt. % of linear very low density polyethylene resin having a density of 0.870 to 0.918 g/cm$^3$, a melt flow rate of 0.3 to 5 g/10 minutes and a Vicat softening point of lower than 99° C., 3 to 50 wt. % of polyethylene resin having a density of 0.930 to 0.965 g/cm$^3$, a melt flow rate of 0.4 to 5 g/10 minutes and a Vicat softening point of higher than 110° C., 0.1 to 15 wt. % of carbon black and 0.01 to 2 wt. % of antioxidant.

2. The packaging material of claim 1, wherein the linear very low density polyethylene resin has a density of 0.890 to 0.910 g/cm$^3$, a melt flow rate of 0.8 to 3 g/10 minutes and a Vicat softening point of 55° to 97° C.

3. The packaging material of claim 1, wherein the molecular weight distribution of the linear very low density polyethylene resin is more than 2.5 measured by gel permeation chromatography.

4. The packaging material of claim 1, wherein the content of the polyethylene resin is 5 to 25 wt. %.

* * * * *